United States Patent
Takagi et al.

(10) Patent No.: US 6,815,087 B2
(45) Date of Patent: Nov. 9, 2004

(54) ALUMINUM-COATED STRUCTURAL MEMBER AND PRODUCTION METHOD

(75) Inventors: Kiyoshi Takagi, Kanagawa (JP); Eizaburo Nakanishi, Yokohama (JP); Tomoyuki Yoshida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/601,585

(22) Filed: Jun. 24, 2003

(65) Prior Publication Data

US 2004/0009366 A1 Jan. 15, 2004

(30) Foreign Application Priority Data

Jul. 11, 2002 (JP) ......................................... 2002-202770

(51) Int. Cl.[7] ............................ B32B 15/20; C21D 9/46
(52) U.S. Cl. ........................ 428/653; 148/516; 148/531; 148/534; 428/610; 428/640; 428/686; 428/939
(58) Field of Search ................................. 428/653, 610, 428/640, 686, 939; 148/516, 531, 534

(56) References Cited

U.S. PATENT DOCUMENTS 4,517,229 A  5/1985  Nichola et al.
4,546,051 A  10/1985  Uchida et al.
5,789,089 A * 8/1998  Maki et al. .................. 428/653

FOREIGN PATENT DOCUMENTS

FR  1 391 659       3/1965
JP  2000-204463 A   7/2000

OTHER PUBLICATIONS

Patent Abstracts of Japan, vol. 004, No. 135, Sep. 20, 1999, JP 55–085623, Jun. 27, 1980.

* cited by examiner

*Primary Examiner*—Robert R. Koehler
(74) *Attorney, Agent, or Firm*—Foley & Lardner LLP

(57) ABSTRACT

An aluminum-coated structural member includes an Al—Si—Fe alloy layer formed on a steel substrate layer. The alloy layer includes a softer region having a hardness smaller than or equal to a hardness of the steel substrate layer, extends from the surface of the steel substrate layer toward a surface of the alloy layer, over a depth range greater than or equal to 50% of a thickness of the alloy layer. The Al—Si—Fe alloy layer has an oxide weight smaller than or equal to 500 mg/dm$^2$.

10 Claims, 5 Drawing Sheets

OUTER LAYER
INTERMEDIATE LAYER 1
INTERMEDIATE LAYER 2
INTERMEDIATE LAYER 3
INNER LAYER

TABLE 1

| No. | PRODUCTION | | COATING LAYER STRUCTURE & COMPOSITION (%) | | | | | | STEEL BASE HARDNESS (Hv) | COATING LAYER HARDNESS (Hv) | | | OXIDE WEIGHT (mg/dm²) | FORMABILITY | CORROSION RESISTANCE | WELDABILITY |
|---|---|---|---|---|---|---|---|---|---|---|---|---|---|---|---|---|
| | RAISED TEMPERATURE (°C) | HOLD TIME (min.) | COMPONENT & HARDNESS | INNER | INTER 1 | INTER 2 | INTER 3 | OUTER | | SOFTEST | AVERAGE | SOFTER RANGE (%) | | | | |
| 1 | 920 | 3 | Al | 7.7 | 31.0 | 48.4 | 31.6 | 54.8 | 450 | 310 | 415 | 51 | 300 | ○ | ○ | ○ |
| | | | Si | 2.0 | 3.9 | 1.2 | 5.7 | 0.8 | | | | | | | | |
| | | | Fe | 89.6 | 65.9 | 50.1 | 62.0 | 44.5 | | | | | | | | |
| | | | Hv | 310 | 360 | 750 | 700 | 800 | | | | | | | | |
| 2 | 900 | 2 | Al | 27.2 | 48.4 | 31.6 | — | 54.9 | 415 | 380 | 455 | 22 | 275 | ○ | ○ | ○ |
| | | | Si | 4.1 | 1.2 | 5.7 | — | 0.8 | | | | | | | | |
| | | | Fe | 67.2 | 50.1 | 61.9 | — | 44.1 | | | | | | | | |
| | | | Hv | 380 | 760 | 720 | — | 810 | | | | | | | | |
| 3 | 930 | 10 | Al | 9.4 | — | — | — | 11.6 | 400 | 305 | 385 | 78 | 550 | × | × | × |
| | | | Si | 1.3 | — | — | — | 1.8 | | | | | | | | |
| | | | Fe | 88.4 | — | — | — | 85.7 | | | | | | | | |
| | | | Hv | 305 | — | — | — | 410 | | | | | | | | |
| 4 | 950 | 5 | Al | 6.0 | 27.8 | 51.9 | 30.4 | 47.4 | 440 | 280 | 400 | 59 | 385 | ○ | ○ | ○ |
| | | | Si | 1.5 | 4.3 | 0.6 | 5.3 | 2.2 | | | | | | | | |
| | | | Fe | 90.7 | 66.7 | 46.8 | 63.1 | 49.8 | | | | | | | | |
| | | | Hv | 280 | 340 | 720 | 690 | 800 | | | | | | | | |
| 5 | 900 | 4 | Al | 3.2 | 54.5 | 33.4 | — | 54.5 | 440 | 300 | 410 | 56 | 335 | ○ | ○ | ○ |
| | | | Si | 0.4 | 2.5 | 15.3 | — | 6.8 | | | | | | | | |
| | | | Fe | 94.3 | 42.7 | 51.4 | — | 38.4 | | | | | | | | |
| | | | Hv | 300 | 740 | 700 | — | 810 | | | | | | | | |

FIG.5

TABLE 2

| HEATING TEMPERATURE (°C) | HOLDING TIME (min.) | OXIDE WEIGHT (mg/dm$^2$) | ADHESION | |
|---|---|---|---|---|
| | | | PIN HOLE | CROSS CUT TEST |
| 950 | 3 | 290 | NONE | ○ |
| | 5 | 385 | NONE | ○ |
| | 10 | 540 | PRODUCED | × |
| | 15 | 690 | PRODUCED | × |
| | 20 | 760 | PRODUCED | × |
| | 25 | 790 | PRODUCED | × |
| | 30 | 805 | PRODUCED | × |

ALUMINUM-COATED STRUCTURAL MEMBER AND PRODUCTION METHOD

BACKGROUND OF THE INVENTION

The present invention relates to an aluminum-coated structural member and a production method thereof. More specifically, the present invention relates to an aluminum-coated structure member, such as a structural member used for motor vehicles, produced by applying heat treatment and forming operation to aluminum-coated steel sheet, and coated with an alloy layer of an Al—Si—Fe alloy for improvement in formability, weldability and corrosion resistance.

A Published Japanese Patent Application Publication No. 2000-204463 shows a hot-dip aluminum-coated steel sheet which can be used for motor vehicles as fuel tank, muffler, heat shield plate, etc., from the viewpoint of excellent corrosion resistance due to oxide film, and less burden on the environment due to non-inclusion of heavy metal such as lead.

SUMMARY OF THE INVENTION

A hard Al—Fe alloy layer contained in a hot-dip aluminum-coated steel sheet at an interface with a steel substrate is more or less problematical in the formability. Moreover, the alloy layer tends to suffer cracks in a forming operation, and hence sometimes entails another treatment to ensure sufficient corrosion resistance. Weldability is another problem because an aluminum coating layer is low in melting point, and an aluminum single surface layer is insufficient in thermal conductivity. Accordingly, the hot-dip aluminum-coated steel sheet is limited in application.

It is an object of the present invention to provide aluminum-coated structural member and production method to the advantage of corrosion resistance, formability and weldability and wider application in motor vehicles.

According to one aspect of the present invention, an aluminum-coated structural member comprises: a steel substrate layer; and an Al—Si—Fe alloy layer formed on a surface of the steel substrate layer, the alloy layer including a softer region having a hardness smaller than or equal to a hardness of the steel substrate layer, extending from the surface of the steel substrate layer toward a surface of the alloy layer, and having a thickness greater than or equal to 50% of a thickness of the alloy layer, the Al—Si—Fe alloy layer having an oxide weight smaller than or equal to 500 mg/dm$^2$.

According to another aspect of the invention, a production method of an aluminum-coated structural member comprises: a first method element of heating a hot-dip aluminum-coated steel sheet at a heating rate in a range of 1~10° C./sec; a second method element of holding the hot-dip aluminum steel sheet at a raised temperature in a temperature range of 900~950° C. for a duration in a range of 2~8 minutes; a third method element of cooling the hot-dip aluminum-coated steel sheet to a temperature in a temperature range of 700~800° C. at a cooling rate in a range of 5~15° C./sec; a fourth method element of forming the hot-dip aluminum-coated steel sheet into a predetermined shape in the temperature range of 700~800° C.; and a fifth method element of cooling the hot-dip aluminum-coated steel sheet in the predetermined shape rapidly from the temperature range of 700~800° C. to a lower temperature lower than or equal to 300° C. at a cooling rate in a range of 20~100° C./sec.

DETAILED DESCRIPTION OF THE INVENTION

In general, a hot-dip aluminum-coated steel sheet is formed by immersing a strip continuously in a bath of molten aluminum. According to the coating metal component, hot-dip aluminum-coated steel sheets are classified broadly into two categories. One employs, as coating metal, pure aluminum (for weather resistance), and the other employs Al—Si alloy (for heat resistance) containing Si in addition to Al. An embodiment according to the present invention employs heat resisting coated steel sheet containing an additive of Si (approximately 3~11% Si).

The addition of Si to the coating layer is for restraining the growth of a hard Al—Fe alloy layer in a boundary between the steel and coating during the process of aluminizing, and thereby for improving the adhesion and corrosion resistance of the Al coating layer. In such a hot-dip aluminum-coated steel sheet, there is formed an Al—Si—Fe alloy layer in the boundary between the Al coating and the steel substrate layer.

Figure 2A:
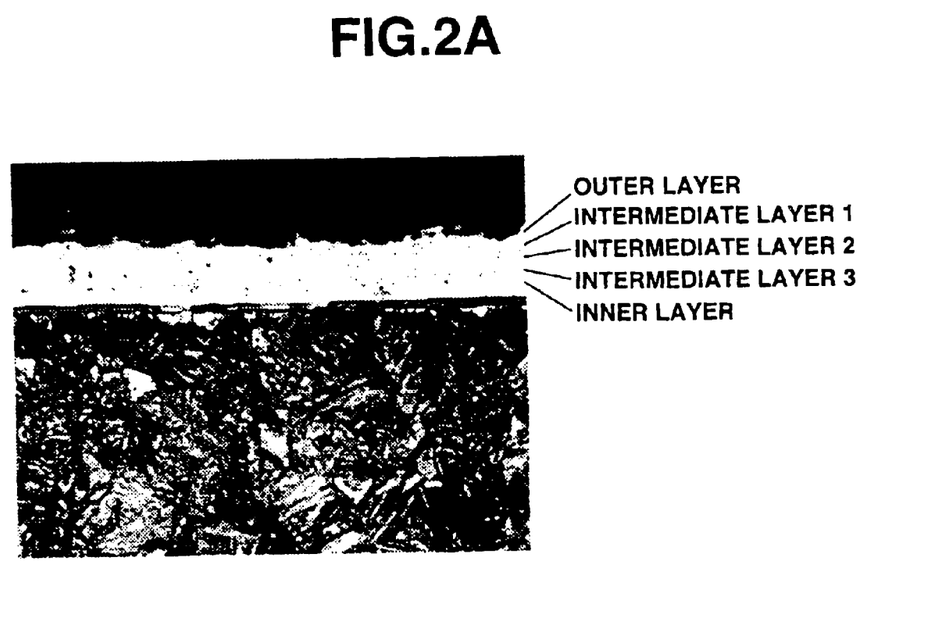
FIG. 2A is a view of a photograph showing a microstructure of a coating layer in a structural member in a practical example No. 1 in the test 1.

When a hot-dip aluminum-coated steel sheet of such a type is subjected to heat treatment under certain conditions, the Al—Si—Fe layer can grow and spread entirely until the surface is reached. FIG. 2A shows a sectional structure in one example of an aluminum-coated steel sheet including such an Al—Si—Fe layer grown to the surface by the heat treatment.

During the growth of the Al—Si—Fe alloy layer by the heat treatment, mutual diffusion between Al coating and steel substrate layer produces various Al—Si—Fe ternary intermetallic compounds such as αFeAlSi phase (alpha FeAlSi), βFeAlSi phase (beta FeAlSi) and γFeAlSi phase (gamma FeAlSi). The Al—Si—Fe alloy layer formed by the heat treatment has a layered structure made up of these intermetallic compounds, and offers advantages of formability, corrosion resistance and weldability.

When the hardness of Al—Si—Fe alloy layer exceeds the hardness of steel substrate, the Al—Si—Fe alloy layer exerts adverse influence on the formability in the forming process of the steel sheet, and on the corrosion resistance by deteriorating the compliance of the coating and increasing the possibility of cracks in the coating. Therefore, in this embodiment, there is formed a less hard or soft layer having a hardness smaller than the hardness of the steel substrate at or near the boundary between the steel and coating. This soft layer prevents crack, even if produced by any chance, from extending deeper from the surface toward the steel substrate. In this embodiment, the thickness of this soft layer is made equal to or greater than 50% of the total thickness of the alloy coating layer. The thick soft layer extending from a level at or near the boundary with the steel substrate, to or beyond the middle in the depth of the coating layer is effective for preventing progress of crack and securing sufficient corrosion resistance.

Oxygen contained in the form of oxides in the coating alloy layer causes pinholes in the process of electro deposition and thereby deteriorates the adhesion between the coating and deposited film if the amount of oxygen is increased. Therefore, the oxide quantity or oxide weight is made equal to or less than 500 mg/dm$^2$. In this specification, "oxide weight" is defined, as mentioned later, as a difference in mass between the mass of a specimen after a heat treatment at 950° C. and the mass of the specimen before the heat treatment.

The mechanism of formation of the layered structure is not fully evident. Currently, the presumption by the inventors of the present invention is as follows: (1) The retention of a specimen at an elevated temperature causes the diffusion of Fe, and produce a concentration gradient in Fe and Si in the coating layer. (2) In this case, the coating alloy phase is urged to transform into a stable compound phase determined by the composition at each depth, so that there are formed different compound layers in different regions of depth. (3) Therefore, by controlling the raised temperature of the heating and the holding time at the raised temperature, the diffusion quantity of Fe is varied and the degree of transformation into a stable compound is varied.

The Al—Si—Fe alloy layer contiguous with the steel substrate layer is softened by the diffusion of Fe from the steel substrate layer, and made more adhesive with steel, and hence more formable. Specifically, a preferable range of the Fe content is 85~95%. When the Fe content is in this range, the hardness of the soft layer contacting with the steel substrate is equal to or lower than 80% (300~400 Hv) of an average hardness of the coating layer. When the Fe content is less than 85%, the above-mentioned advantageous effect by the diffusion of Fe tends to be insufficient. When the Fe content is more than 95%, the diffusion of Fe tends to become excessive and to make the Al content too low to obtain the corrosion resistance in the outermost layer in the multi-layer structure. In this specification, the percent % is used to mean "mass %" (percent by mass) unless otherwise specified.

The Al—Si—Fe alloy layer is made softer by the heat treatment and diffusion of Fe from the steel substrate. However, excessive diffusion of Fe could decrease the Al content below a level needed for the corrosion resistance. In order to maintain the minimum Al content from the viewpoint of corrosion resistance, and to form a layer softer than the steel base material, it is preferable to set the Al content within the range of 25~40% at least in one of three or more layers of the multi-layer structure. The corrosion resistance tends to be insufficient when the Al content is less than 25%. The formation of a softer layer becomes difficult, and the adhesion with the steel base could become poor when the Al content is more than 40%.

In the case of a multi-layer structure including three or more subordinate layers differing in composition or compound, there is one or more intermediate layers between an innermost layer contiguous with the steel substrate layer and an outermost layer forming the surface of the coating layer. Preferably, the intermediate layer or at least one of the intermediate layers contains 25~40% Al.

The weldability is improved by alloying of the aluminum coating layer with Fe diffused from the steel base material. The alloyed Al—Si—Fe coating layer is higher in melting point than an Al coating layer formed by hot dipping, so that welding is feasible from low current condition. Moreover, adhesion of coating metal to a welding electrode is prevented in spot welding, to the advantage of improvement in consecutive spot welding.

Thermal stability is improved by alloying an Al—Si—Fe coating layer entirely into a multi-layer structure such as a five-layer structure having five layers of different alloy compositions. A multi-layer structure including a hard outermost layer is advantageous for maintaining good contact with a welding gun in spot welding even under great pressure for high tension material.

As the Fe content increases with the progress of alloying between the aluminum coating layer and Fe diffused from the steel base, the thermal conductivity of the coating layer decreases and the welding with lower current becomes feasible. It is possible to combine weldability and corrosion resistance by making the Fe concentration in the surface or outermost layer of the coating in the rang of 35~50%. The coating layer having a surface Fe concentration in this range can be formed by forming an Al—Si—Fe layer having a multi-layer structure, or by forming an Al—Si—Fe layer having a concentration gradient of Fe content. The improvement in weldability is insufficient when the Fe concentration in the outermost layer is less than 35%. The Al content is decreased relatively and the corrosion resistance degrades when the Fe concentration in the outermost layer is more than 50%.

An aluminum-coated structural member having an Al—Si—Fe alloy layer on the surface as mentioned above can be obtained by the following process. First, a heat resisting hot-dip aluminum-coated steel sheet containing Si in a coating layer is heated at a rate of 1~10° C./sec to a temperature in the temperature range of 900~950° C., and held at that raised temperature for a holding time (or duration) of 2~8 minutes. In this case, the aluminum coating could melt locally when the hot-dip aluminum-coated steel sheet is heated at a heating rate faster than 10° C./sec to a temperature higher than 900° C. The coating layer could oxidize when the heating rate is slower than 1° C./sec. The progress of austenitizing in the steel base material is too slow to obtain a sufficient strength as a structural member when the raised temperature at which the specimen is held is lower than 900° C. When the raised temperature is higher than 950° C., the undesired oxidation of the coating layer proceeds, and the diffusion of Fe proceeds too much up to the surface of the coating layer. When the time for holding at the raised temperature is shorter than 2 minutes, then the formation of Al—Si—Fe alloy layer becomes insufficient. When the time for holding at the raised temperature is longer than 8 minutes, the oxidation of coating layer proceeds, and undesired influence is exerted on the adhesiveness of the coating film by electro deposition.

After the heat treatment for holding in the above-mentioned temperature range, the steel sheet is carried from a heating furnace to a forming press. During the transportation, cooling starts. In this case, the rate of cooling after the heat treatment is required to be 5~15° C./sec in order to perform the forming operation at a predetermined temperature and the rapid cooling from a predetermined temperature. When the cooling rate is slower than 5° C./sec, the oxidation of the coating layer becomes conspicuous. For cooling at a rate higher than 15° C./sec, the need arises for forced cooling.

The forming operation into a desired shape is started in the temperature range of 700~800° C. After the forming operation, the shaped sheet is cooled rapidly from the temperature range of 700~800° C., to a temperature lower than or equal to 300° C. at a rate in the range of 20~100° C./sec. By this rapid cooling, the steel base material is cooled while preserving the Al—Si—Fe alloy layer formed by the heat treatment, and an aluminum-coated structural member of a desired shape is obtained. The above-mentioned conditions of the heat treatment are adequate also for quench hardening of the steel base material, and hence effective for enhance the strength of the material. To start the forming operation at a temperature higher than 800° C. is not desirable because reheating is required and oxidation of coating is promoted. When the forming operation is started at a temperature lower than 700° C., the quenching temperature is too low for martensitic transformation. When the cooling rate after the forming operation is slower than 20° C./sec, the transformation to martensite is insufficient, and the diffusion of Fe proceeds too much. When the cooling rate after the forming operation is faster than 100° C./sec, the cost for facility is increased significantly for the need for improving a cooling system in production equipment. The rapid cooling to a temperature lower than or equal to 300° C. is effective for preventing ferrite phase from being left over, and promoting martensitic transformation sufficiently.

The following is explanation on practical examples of the embodiment.

(Test 1) Aluminum-coated or aluminized structural members were produced under the following conditions and investigation was conducted on the formability, corrosion resistance and weldability.

[Hot-dip aluminum-coated steel sheet to be tested]

Composition of original sheet for coating: 0.22% C, 0.22% Si, 1.0% Mn, 0.015% P, 0.007% S.

Sheet thickness: 1.4 mm.

Si concentration in Aluminum coating: 5%.

Thickness of aluminum coating layer: 10~20 µm.

Figure 1:
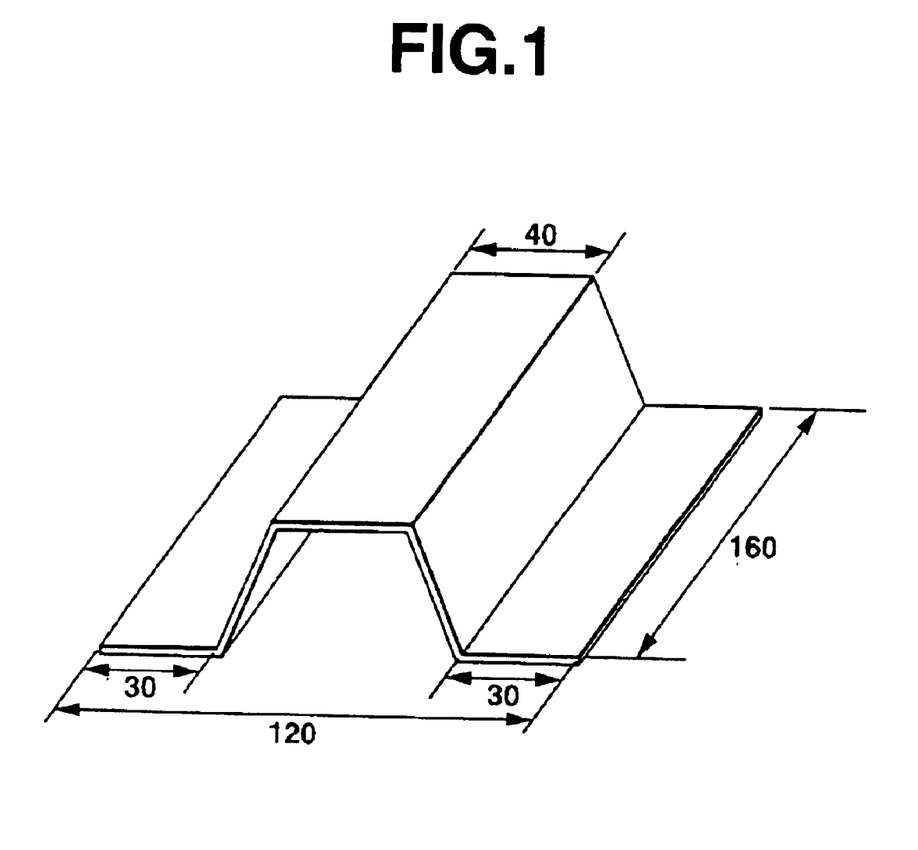
FIG. 1 is a perspective view showing the shape and dimensions of specimens used in a test 1 according to an embodiment of the present invention, for evaluation of the formability.

[Test Procedure] From the above-mentioned hot-dip aluminum-coated steel sheet, a flat plate having a width of 160 mm, and a length of 160 mm was cut out, heat-treated under the following conditions and formed into a shape shown in FIG. 1. Then, investigation was conducted on the composition of the alloy coating layer, hardness, formability, corrosion resistance and weldability.

<Conditions of Heat Treatment>

| Heating rate: | 8° C./sec |
| Heating temperature: | 900~950° C. |
| Holding time: | 2~10 min |
| Rate of Primary cooling: | 7° C./sec |
| Temperature at a start of forming: | 720° C. |
| Temperature at a start of rapid cooling: | 720° C. |
| Rate of Secondary cooling (quenching): | 30° C./sec |
| Temperature at an end of cooling: | 100° |

Figure 4:
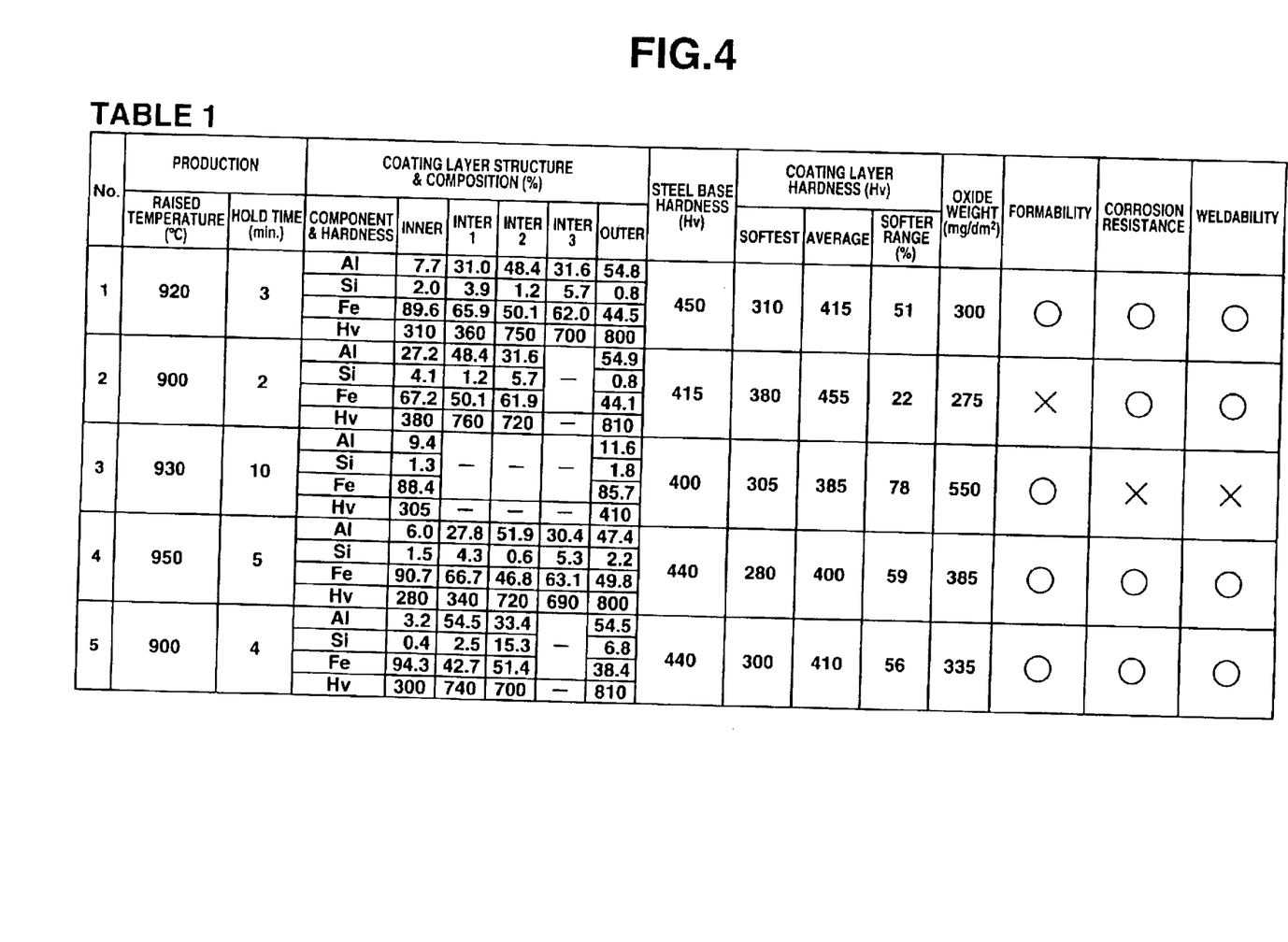
FIG. 4 is a view of a table 1 showing the result of test 1 in the embodiment.

[Results of Testing] Table 1 shows the results of the test. In all the cases in Table 1, a softest layer in a coating is a layer contiguous with a steel substrate layer of steel base material. Table 1 includes a column of production conditions, divided into a column of raised temperature and a column of hold time; a column of coating layer structure and composition (%), divided into a column of component and hardness, a column of inner layer (INNER), a column of first intermediate layer (INTER1), a column of a second intermediate layer (INTER2), a column of a third intermediate layer (INTER3), and a column of outer layer (OUTER); a column of hardness of steel base material (Hv); a column of hardness of coating layer (Hv), divided into a column of softest layer, a column of average, and a column of a range (%) softer than the base material; a column of oxide weight (mg/dm$^2$); a column of formability; a column of corrosion resistance; and a column of weldability.

Figure 2B:
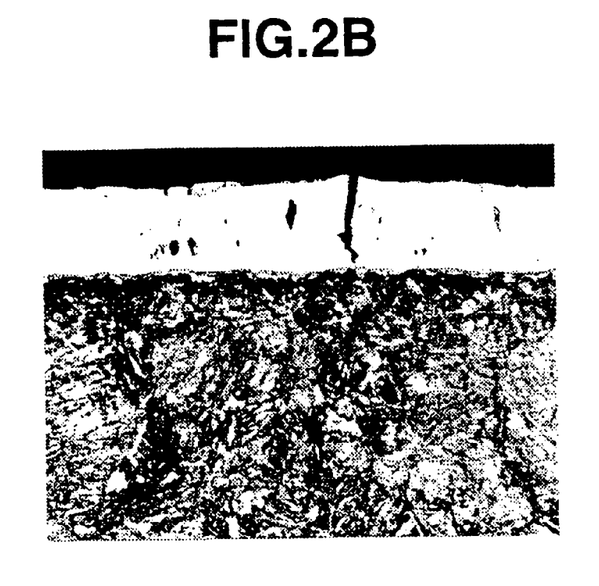
FIG. 2B is a view of a photograph showing a microstructure of a coating layer in a structural member in a practical example No. 2 in the test 1.

<Formability> Cracking was checked in the Al—Si—Fe alloy layer after the forming operation. Test samples having no cracks reaching the steel substrate layer were evaluated as proper and indicated by a sign of a circle. Samples having one or more cracks reaching the steel substrate layer were evaluated as improper and indicated by a sign of a cross. The samples showed good formability except the structural member of No. 2 coated with a coating layer so hardened that an average hardness of the coating layer is greater than the hardness of the steel base material, and the hardness of the coating layer is harder in a region spreading over a depth range greater than 50% of the thickness of the alloy layer. As a typical example, FIG. 2A shows a micro structure of the coating layer in the structural member of No. 1 having no cracks, and FIG. 2B show a micro structure of the coating layer in the structural member of No. 2 suffering a crack.

<Corrosion Resistance> Produced structural members were subjected to a salt spray test (SST) as defined by JIS Z2371, to evaluate the corrosion resistance of each structural member. As a result, a poorer corrosion resistance was shown by the structural member of No. 3 in which the diffusion of Fe was excessive because of too long a holding time at the raised temperature, and hence the aluminum content was too low in the outermost layer.

<Weldability> Produced structural members were subjected to spot welding in succession under the conditions mentioned below. As the number of consecutive spots increases, in general, a nugget diameter tends to decrease and the weld strength tends to decrease. Accordingly, spot welding was carried out under the following welding conditions until the number of spots reaches a number smaller than a class A judgment reference in JIS Z3140. The weldability was determined in accordance with the number of consecutive spots. The No. 3 structural member was judged as improper and indicated by X since the number of consecutive spots was about 500 below the level of the judgment reference. As to the structural members other than the No. 3 structural member, numbers of spot welds up to 3000, to a level satisfying the judgment reference were obtained and the spot welding was ended at that point. Thus, the structural members other than the No. 3 specimen are indicated as proper by circle. Thus, the results of the test show that the weldability is degraded when the holding time for the heat treatment is too long and the diffusion of Fe softens the coating layer, as in the No. 3 sample. The No. 3 sample is poorer in corrosion resistance and weldability. However, the No. 3 sample is good in formability. Therefore, the No. 3 sample is still adequate for some applications.

[Welding Conditions]

| | |
|---|---|
| Base material: | Aluminum-coated steel sheet (thickness of 1.2 mm) and GA material (2.0 mm thick) of a type having a tensile strength of 440 Mpa |
| Pressing Force: | 5.98 kN |

-continued

| | |
|---|---|
| Squeeze: | 50 Hz |
| Up slope: | 3 Hz |
| Energization: | 9 kA × 18 Hz |
| Hold: | 21 Hz |

Figure 3:
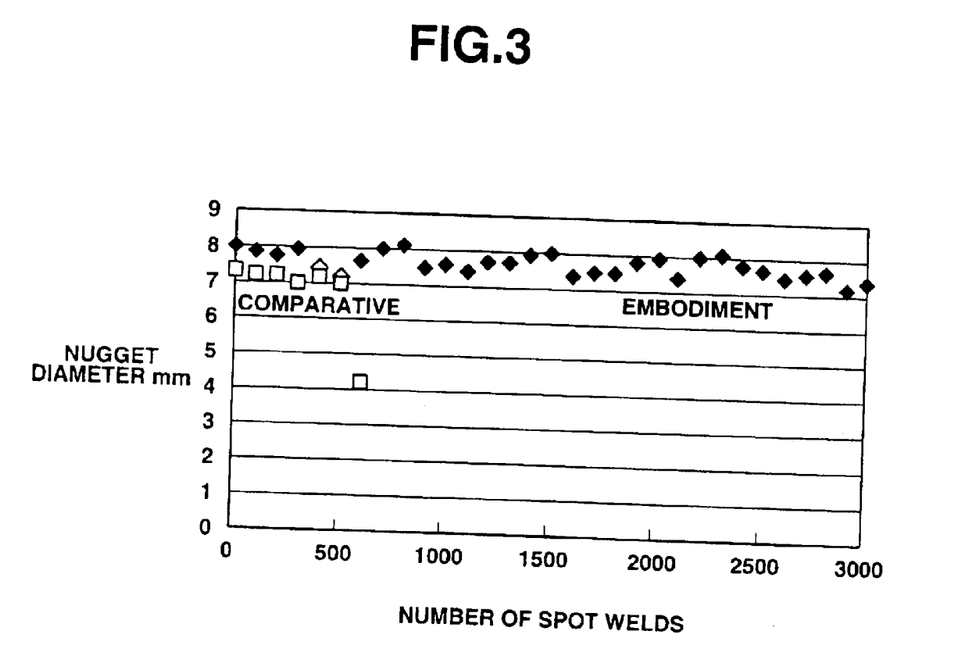
FIG. 3 is a graph showing performance of consecutive spot welds in spot welding, of a structural member in the embodiment of the present invention in comparison with an ordinary hot-dip aluminum-coated steel sheet.

(Test 2) By using a hot-dip aluminum-coated steel sheet heat-treated in the same manner as the No. 1 sample of Test 1, and a hot-dip aluminum-coated steel sheet not subjected to heat treatment, as a comparative sample, comparison was made about the characteristic of consecutive spot welds under the following conditions. FIG. 3 shows the results of the test 2 for samples of the embodiment and comparative samples. The sample using the hot-dip aluminum-coated steel sheet without heat treatment shows about 500 points whereas the sample of this example according to the present invention shows 3000 points or more.

(Test Conditions)

| | |
|---|---|
| Base material: | Aluminum-coated steel sheet (1.2 t) and GA material (2.0 t) of a type having a tensile strength of 440 Mpa |
| Pressing Force: | 610 kgf |
| Squeeze: | 50 cyc |
| Up slope: | 3 cyc |
| Energization: | 9kA × 18 cyc |
| Hold: | 21 cyc |

Figure 5:
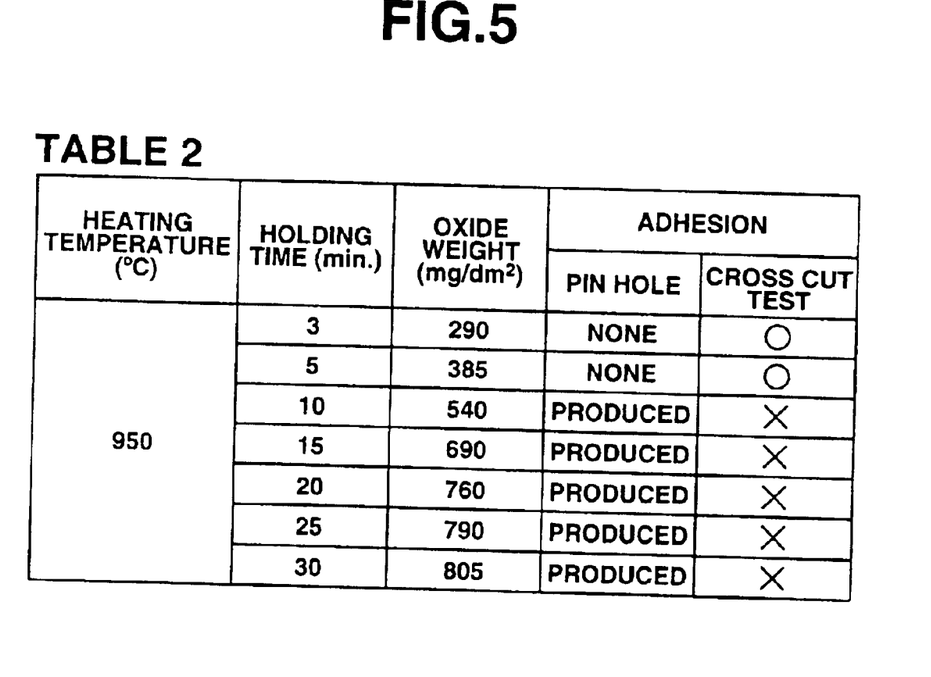
FIG. 5 is a view of a table 2 showing the result of test 3 in the embodiment.

(Test 3) Hot-dip aluminum-coated steel sheets were held at 950° C. for various lengths of time, to form an Al—Si—Fe alloy layer, and subjected to electro deposition coating onto the alloy layer. Then, the samples were checked to examine a relation between the oxide weight in the alloy layer and the paintability. The results are shown in Table 2. The oxide weight herein is defined as a difference in mass between the result of mass measurement by a chemical balance before the heating and the result of mass measurement after the heating.

As evident from Table 2, when the oxide weight becomes greater than 500 mg/dm$^2$, the occurrence of pinhole becomes noticeable in the deposited coating film. In the samples impaired with pinholes, the adhesion of the coating film is insufficient, and the corrosion resistance is not improved sufficiently by the electro deposition coating.

In the aluminum-coated structural member according to the embodiment of the present invention, the Al—Si—Fe alloy layer on the steel substrate or base layer prevents a hard layer from being formed between the steel substrate and the coating, and instead forms a softer region ranging wide in the depth direction. Moreover, the alloy layer is low in the oxide weight. Therefore, the embodiment can improve the formability and the paintability, and attain both corrosion resistance and weldability by balancing the Al content and Fe content.

In the production method according to the embodiment of the present invention, a steel sheet coated with a hot-dip aluminum coating layer containing Si is heat-treated, formed into a desired shape, and cooled rapidly. Therefore, this production method can improve the corrosion resistance, paintability, weldability and formability.

This application is based on a prior Japanese Patent Application No. 2002-202770 filed on Jul. 11, 2002. The entire contents of this Japanese Patent Applications No. 2002-202770 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An aluminum-coated structural member comprising:
a steel substrate layer; and
an Al—Si—Fe alloy layer formed on a surface of the steel substrate layer, the alloy layer including a softer region having a hardness smaller than or equal to a hardness of the steel substrate layer, extending from the surface of the steel substrate layer toward a surface of the alloy layer, and having a thickness greater than or equal to 50% of a thickness of the alloy layer, the Al—Si—Fe alloy layer having an oxide weight smaller than or equal to 500 mg/dm$^2$.

2. The aluminum-coated structural member as claimed in claim 1, wherein the Al—Si—Fe alloy layer has a multi-layer structure including an inner layer contiguous with the steel substrate layer, and an outer layer forming the surface of the alloy layer.

3. The aluminum-coated structural member as claimed in claim 2, wherein the inner layer is a softest layer in the multi-layer structure.

4. The aluminum-coated structural member as claimed in claim 2, wherein the inner layer contains 85~95% Fe, and the inner layer is softer in Hv hardness than an average hardness of the alloy layer by a percentage more than or equal to 20%.

5. The aluminum-coated structural member as claimed in claim 2, wherein the multi-layer structure of the Al—Si—Fe alloy layer further comprises an intermediate layer containing 25~40% Al, and the intermediate layer is lower in hardness than the steel substrate layer.

6. The aluminum-coated structural member as claimed in claim 2, wherein the multi-layer structure of the Al—Si—Fe alloy layer further comprises a plurality of intermediate layers, at least one of the intermediate layers containing 25~40% Al, and being lower in hardness than the steel substrate layer.

7. The aluminum-coated structural member as claimed in claim 2, wherein the outer layer of the Al—Si—Fe alloy layer is harder than the steel substrate layer.

8. The aluminum-coated structural member as claimed in claim 2, wherein the outer layer contains 35~50% Fe.

9. An aluminum-coated structural member comprising:
a steel substrate layer; and
an Al—Si—Fe alloy layer formed on a surface of the steel substrate layer, the Al—Si—Fe alloy layer having a multi-layer structure including an inner layer contiguous with the steel substrate layer, an outer layer forming a surface of the alloy layer and an intermediate layer formed between the inner and outer layers, the inner layer containing 85~95% Fe, the intermediate layer containing 25~40% Al, and the outer layer being harder than the steel substrate layer.

10. A production method of an aluminum-coated structural member comprising:
heating a hot-dip aluminum-coated steel sheet at a heating rate in a range of 1~10° C./sec;
holding the hot-dip aluminum steel sheet at a raised temperature in a temperature range of 900~950° C. for a duration in a range of 2~8 minutes;
cooling the hot-dip aluminum-coated steel sheet to a temperature in a temperature range of 700~800° C. at a cooling rate in a range of 5~15° C./sec;

forming the hot-dip aluminum-coated steel sheet into a predetermined shape in the temperature range of 700~800° C.; and cooling the hot-dip aluminum-coated steel sheet in the predetermined shape rapidly from the temperature range of 700~800° C. to a lower temperature lower than or equal to 300° C. at a cooling rate in a range of 20~100° C./sec.

* * * * *